(12) United States Patent
Feron et al.

(10) Patent No.: US 11,709,581 B2
(45) Date of Patent: Jul. 25, 2023

(54) DEVICE FOR CONTROLLING THE ACTIVATION OF FUNCTIONS OF A VEHICLE

(71) Applicant: PSA AUTOMOBILES SA, Poissy (FR)

(72) Inventors: Stephane Feron, Le Plessis Robinson (FR); Romain Mottier, Paris (FR); Ghislain De Frescheville, Versailles (FR); Kevin Anne, Plaisir (FR); Audrey Nielot, Bievres (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 17/790,043

(22) PCT Filed: Nov. 18, 2020

(86) PCT No.: PCT/FR2020/052105
§ 371 (c)(1),
(2) Date: Jun. 29, 2022

(87) PCT Pub. No.: WO2021/144510
PCT Pub. Date: Jul. 22, 2021

(65) Prior Publication Data
US 2023/0055753 A1 Feb. 23, 2023

(30) Foreign Application Priority Data
Jan. 15, 2020 (FR) ..................................... 2000350

(51) Int. Cl.
*G06F 3/048* (2013.01)
*G06F 3/0482* (2013.01)
*B60K 37/06* (2006.01)

(52) U.S. Cl.
CPC ............ *G06F 3/0482* (2013.01); *B60K 37/06* (2013.01); *B60K 2370/143* (2019.05); *B60K 2370/1876* (2019.05)

(58) Field of Classification Search
CPC .......... G06F 3/0482; B60K 2370/1876; B60K 2370/143; B60K 37/06
See application file for complete search history.

(56) References Cited

U.S. PATENT DOCUMENTS

2002/0055844 A1    5/2002  L'Esperance et al.
2016/0046188 A1*   2/2016  Wild ...................... B60K 35/00
                                                  701/36

(Continued)

FOREIGN PATENT DOCUMENTS

EP    0928254 B1    5/2002
EP    3249497 A1    11/2017

OTHER PUBLICATIONS

International Search Report for PCT/FR2020/052105 dated Jan. 28, 2021.
Written Opinion for for PCT/FR2020/052105 dated Jan. 28, 2021.

*Primary Examiner* — David E Choi
(74) *Attorney, Agent, or Firm* — Sandberg Phoenix & von Gontard PC

(57) ABSTRACT

A device for controlling the activation/deactivation of at least one function performed by electronic equipment of a vehicle comprises a screen able to display a first menu for activating/deactivating said functions, the first, menu including a plurality of displayed elements comprising, for at least one of the functions, a state of the function chosen from an activated state, a deactivated state and an unavailable state, the device comprising selection means for selecting and activating at least one displayed element, wherein, when the state of a function is the unavailable state, the first menu is designed to display an element associated with said unavail- (Continued)

able function and the selection of which makes it possible to display an unavailability window containing unavailability information regarding the unavailable state.

8 Claims, 1 Drawing Sheet

(56) References Cited

U.S. PATENT DOCUMENTS

| | | | |
|---|---|---|---|
| 2016/0210110 A1* | 7/2016 | Feldman | G06F 3/165 |
| 2016/0299617 A1* | 10/2016 | Hanson | G06F 3/0416 |
| 2017/0280701 A1* | 10/2017 | Teh | A01M 29/18 |
| 2018/0196589 A1* | 7/2018 | Feit | G06F 3/04847 |
| 2020/0309556 A1* | 10/2020 | Tsay | G01C 21/3476 |

* cited by examiner

DEVICE FOR CONTROLLING THE ACTIVATION OF FUNCTIONS OF A VEHICLE

CROSS-REFERENCE TO RELATED APPLICATIONS

This application is the US National Stage under 35 USC § 371 of International Application No. PCT/FR2020/052105, filed 18 Nov. 2020 which claims priority to French Application No. 2000350 filed 15 Jan. 2020, both of which are incorporated herein by reference.

BACKGROUND

The technical field concerns devices for controlling the activation/deactivation of electronic functions of a vehicle.

Vehicles equipped with such devices are also disclosed.

Most motor vehicles comprise numerous pieces of electronic equipment providing a set of functionalities or tasks contributing to comfort, on-board entertainment, or driving assistance. Some of these functionalities can be activated or deactivated by a vehicle user according to their preferences. In order to activate/deactivate functionalities, a screen, such as a touchscreen, is frequently used to display a menu allowing the user of this vehicle to selectively activate or deactivate each functionality. The presence of screens in modern vehicles is used to display information or warning messages for the driver. Thus, to indicate the unavailable state of a functionality or a fault affecting such a function, the commonly adopted solution consists in displaying a temporary or permanent alert message on one of the available screens.

Thus, the multiplication of screens and functionalities considerably increases the frequency of occurrence of such an alert. Faced with the increase in information and alerts to be displayed, EP0928254 proposes a method aimed at assigning a priority to the various elements to be displayed in order to select only part of this information.

Furthermore, in order for certain advanced functionalities to be activated, one or more conditions are required that are only rarely met, such that they are frequently unavailable. For such functionality, the use of a displayed message when a fault occurs, for example when a sensor is dirty, or when its status becomes unavailable, risks being perceived as untimely by the driver, even more so if the functionality is not often available. Thus, none of the solutions described above is satisfactory.

SUMMARY

There is therefore a need to improve the existing information solutions for vehicle users. To this end, we propose to solve the cited drawbacks and to make it possible to inform the driver of the state of the functionalities of the vehicle only as much as is necessary. To this end, a device is disclosed for controlling the activation/deactivation of at least one function performed by electronic equipment of a vehicle, the device comprising a screen able to display at least a first menu for activating/deactivating said functions and having a plurality of displayed elements comprising, for at least one of the functions, a state of the function selected from among three states, namely an activated state, a deactivated state and an unavailable state, corresponding to a deactivated and unavailable state for activation, the device comprising selection means for selecting and activating at least one displayed element, wherein, when the state of a function is the unavailable state, the first menu is designed to display an element associated with said unavailable function and the selection of which makes it possible to display an unavailability window containing unavailability information regarding the unavailable state.

Thus, the device comprises a menu making it possible to activate/deactivate the functions through the first menu. When a function cannot be activated, or in other words is unavailable, the first menu indicates that the state of the function is the unavailable state. A user who is not used to using said unavailable function will not notice this unavailability, whereas a user wishing to use the unavailable function, by trying to activate it, will naturally display the first menu. In doing so, he notes the presence of the element associated with said unavailable function and, by selecting it, he may become aware of the unavailability information concerning the unavailable state displayed in the unavailability window. Therefore, the device makes it possible to inform the user of the vehicle only as is necessary according to his uses and needs.

According to one embodiment of the device, the unavailability information is displayed only in the unavailability window. Displaying only in the unavailability window avoids untimely messages.

In one embodiment, the unavailability window comprises a second menu making it possible to prioritize the unavailability information according to several categories comprising the reasons for the unavailable state and/or the corrective actions to make an unavailable function activatable.

Advantageously, the first menu is capable of displaying the name of at least the function whose state is the unavailable state, accompanied by text specific to this unavailable state.

According to one embodiment, the associated element is a pictogram specific to the unavailable state.

Advantageously, the selection means make it possible to change the state of a function in the activated state to the deactivated state and vice versa.

Advantageously again, the screen is a touchscreen, the selection means being provided at least in part by the touch function of the screen.

Also disclosed is a vehicle which comprises the above-described device.

DESCRIPTION OF THE FIGURES

The invention will be better understood upon reading the detailed description that follows, given solely by way of non-limiting example and done in reference to the accompanying drawings, in which.

DESCRIPTION OF THE FIGURES

An activation/deactivation control device 1 makes it possible to control the activation or deactivation of at least one function 2 provided by electronic equipment of a vehicle equipped with the device 1.

Figure 1:
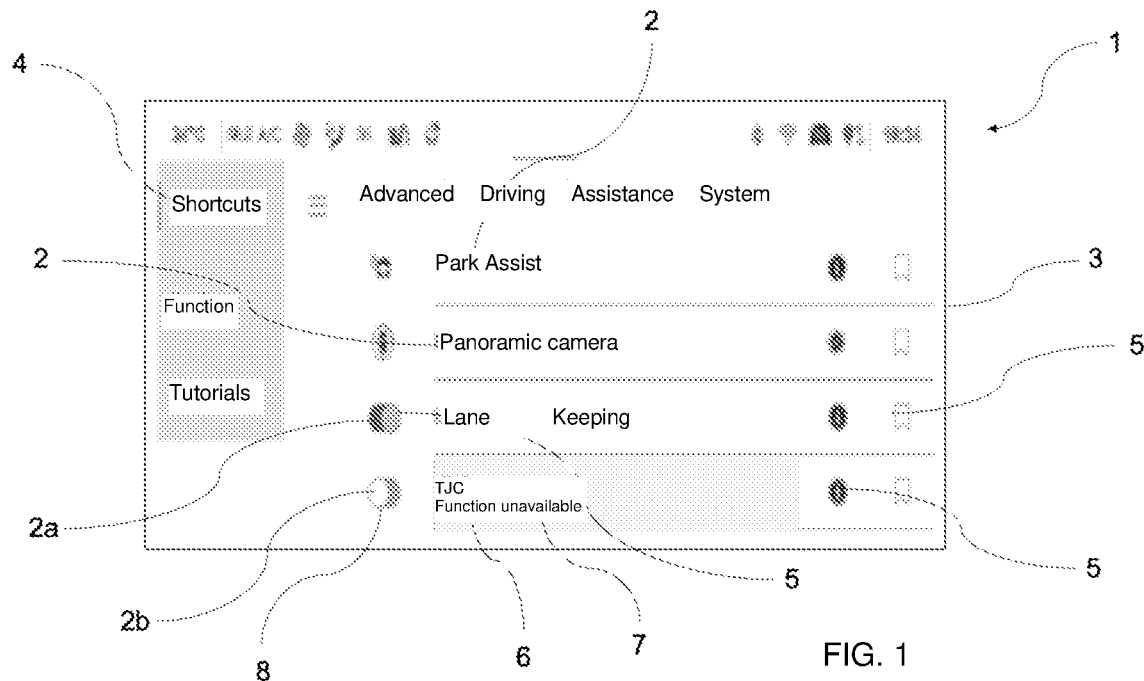
FIG. 1 shows a view of the screen of a device showing a first menu.

The device comprises a screen 3, shown in FIG. 1, capable of displaying at least a first activation/deactivation menu 4 to control the activation or deactivation of said functions 2.

The functions 2 that can be activated or deactivated by the device 1 can be of different types, such as for example functions 2a relating to the entertainment offered to the passengers on board the vehicle, functions relating to comfort, such as for example heating controls, or even functions 2a related to the driving of the vehicle and in particular to driving assistance.

Certain functions 2a can be placed by a user in an activated state, in which the function is operative, or a deactivated state, in which the function is inoperative. There is also an unavailable state in which the function 2b is in the deactivated state and in which the activated state is temporarily or permanently unavailable. Other functions 2 can be controlled by the vehicle, which decides on the activated state or the deactivated state of these functions 2 according to a current context in the vehicle or outside the vehicle. Finally, certain other functions 2 can be systematically placed in an activated state each time the vehicle is put into operation while leaving the possibility for a user to place them in a deactivated state.

In addition, in order for certain functions 2 to be activatable (that is to say, for the user to be able to place them in an activated state), they require several conditions to be met: this is the case for example for the traffic jam chauffeur (TJC) function intended to relieve the driver in dense traffic or traffic jam situations (speed lower than 50/70 km/h) on roads with divided roadways (motorways and expressways). The TJC function is able to maintain fully automated vehicle guidance over a fairly long transition period of around ten seconds before returning to manual driving mode, so the driver is not required to keep their eyes fixed on the road and can attend to other activities. Thus, this TJC function requires that the vehicle is traveling on a compatible road and that the dedicated sensors are not dirty or faulty, such that this TJC function cannot be systematically activated. Thus, the state of the TJC function is frequently the unavailable state and the device 1 is particularly suited to this TJC function.

The first menu 4 comprises a plurality of displayed elements 5 including, for at least one function 2, the state of this function 2, chosen from among the activated state, the deactivated state or the unavailable state. The device 1 also comprises selection means for selecting and activating at least one of the displayed elements 5 and thus allowing a user to make a selection, for at least one of the aforementioned functions 2a, when this function 2a can be activated, among the activated state or the deactivated state. This selection is made according to a current context, in order to define a personal configuration of functions 2.

The first menu 4 is advantageously capable of displaying the name 6 of the function 2, accompanied by specific text 7 whose color can advantageously be chosen according to the state of the function 2.

Advantageously, the screen 3 of the device 1 is touch-sensitive and therefore comprises the selection means.

Figure 2:
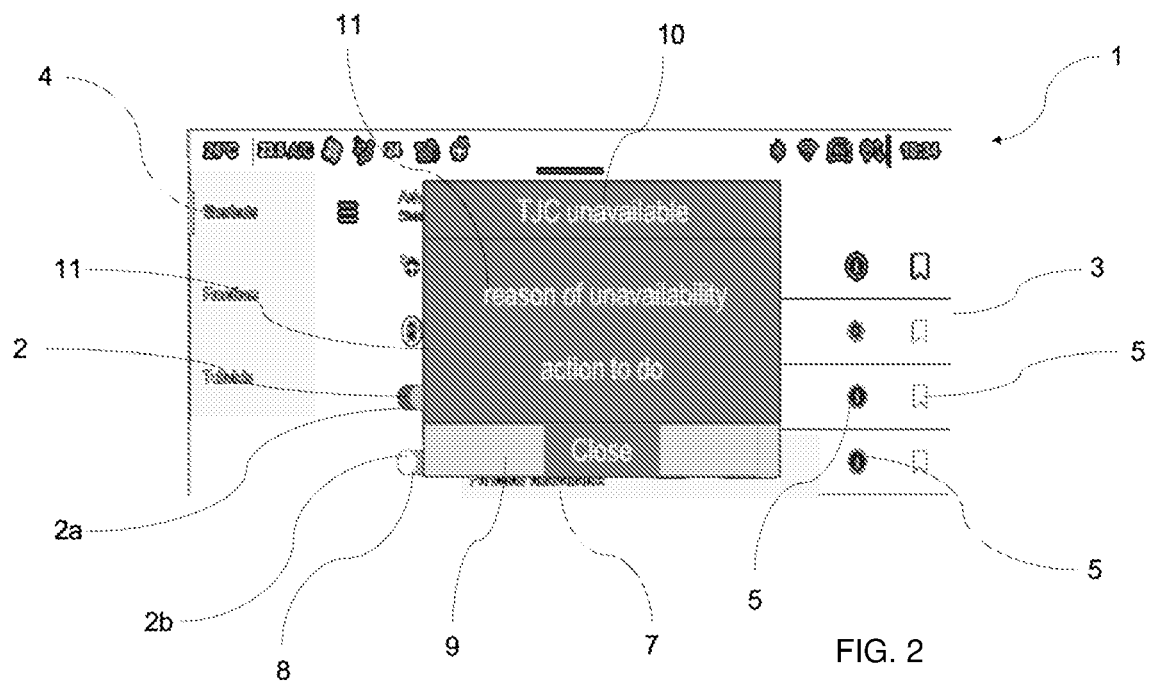
FIG. 2 shows a view of the screen of a device showing an unavailability window.

When a function 2b is in the unavailable state, the first menu 4 is designed to display an element 8 associated with said function 2b, the selection of which makes it possible to display an unavailability window 9, shown in FIG. 2, containing unavailability information 10 concerning the unavailable state of the function 2b. The associated element 8 is for example a pictogram characteristic of an unavailable state. The representation of the associated element 8 can be accompanied, for example, by a change of color or by the flashing of another displayed element 5 and/or of said associated element 8.

The device 1 is designed so that the unavailability information 10 is only displayed in the unavailability window 9.

This unavailability window 9 advantageously comprises a second menu 11 making it possible to prioritize the unavailability information 10 according to several categories: first, the reasons for the unavailable state, and second, the corrective actions to make the unavailable function 2b activatable.

The device 1 makes it possible to inform the user of the vehicle only as is necessary according to his uses and needs, and displays the unavailability information 10 only in the unavailability window 9. Displaying only in the unavailability window 9 avoids untimely messages.

The invention is not limited to the embodiment of the device 1 which is described above only by way of example, but other embodiments can be designed by those skilled in the art without departing from the framework and the scope of the present invention.

The invention claimed is:

1. A device for controlling the activation/deactivation of at least one function performed by electronic equipment of a vehicle, said at least one function being switchable between an active state, an inactive state, and an unavailable state, wherein, when said at least one function is in said unavailable state, said at least one function is deactivated and unavailable for activation; the device comprising:
 a screen adapted to display at least a first menu for activating/deactivating said at least one function, said screen having a plurality of displayed elements for the at least one function, the plurality of display elements indicating the state of the at least one function, and selection means for selecting and activating at least one displayed element to activate or deactivate said at least one function,
 wherein, when the at least one function is in the unavailable state, the first menu is adapted to display a second element associated with said unavailable function, where said second element is adapted to be selected to display an unavailability window containing unavailability information regarding the unavailable state of the at least one function.

2. The device according to claim 1, wherein the unavailability information is displayed only in the unavailability window.

3. The device according to claim 1, wherein the unavailability window comprises a second menu making it possible to prioritize the unavailability information according to several categories comprising the reasons for the unavailable state and/or the corrective actions to make each unavailable function activatable.

4. The device according to claim 1, wherein the first menu is capable of displaying the name of at least the function which is in the unavailable state, accompanied by text specific to this unavailable state.

5. The device according to claim 1, wherein the second element is an icon indicative of the unavailable state.

6. The device according to claim 1, wherein the selection means make it possible to change the state of a function in the activated state to the deactivated state and vice versa.

7. The device according to claim 1, wherein the screen is a touchscreen, the selection means being provided at least in part by a touch function of the screen.

8. A vehicle, characterized in that it comprises a device according to claim 1.

* * * * *